(12) United States Patent
Biscondi et al.

(10) Patent No.: US 8,151,031 B2
(45) Date of Patent: Apr. 3, 2012

(54) LOCAL MEMORIES WITH PERMUTATION FUNCTIONALITY FOR DIGITAL SIGNAL PROCESSORS

(75) Inventors: Eric Biscondi, Opio (FR); David J. Hoyle, Austin, TX (US); Tod D. Wolf, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 451 days.

(21) Appl. No.: 12/399,719

(22) Filed: Mar. 6, 2009

(65) Prior Publication Data

US 2009/0254718 A1 Oct. 8, 2009

Related U.S. Application Data

(63) Continuation-in-part of application No. 11/930,958, filed on Oct. 31, 2007, now abandoned.

(51) Int. Cl.
*G06F 12/00* (2006.01)
(52) U.S. Cl. .......................... 711/5; 711/170
(58) Field of Classification Search .............. 711/5, 170
See application file for complete search history.

(56) References Cited

U.S. PATENT DOCUMENTS

| | | | | |
|---|---|---|---|---|
| 4,969,091 A | * | 11/1990 | Muller | 712/228 |
| 6,487,619 B1 | * | 11/2002 | Takagi | 710/105 |
| 6,898,101 B1 | | 5/2005 | Mann | |
| 7,143,332 B1 | | 11/2006 | Trimberger | |
| 7,412,669 B1 | * | 8/2008 | Lee et al. | 716/119 |
| 2003/0037222 A1 | * | 2/2003 | Emberson et al. | 712/11 |
| 2003/0088754 A1 | * | 5/2003 | Barry et al. | 712/11 |
| 2009/0006816 A1 | * | 1/2009 | Hoyle et al. | 712/215 |
| 2009/0113174 A1 | | 4/2009 | Wolf et al. | |

FOREIGN PATENT DOCUMENTS

| | | |
|---|---|---|
| KR | 1020070029846 A | 3/2007 |
| WO | 2009059179 A1 | 5/2009 |

OTHER PUBLICATIONS

Thomas J. Richardson et al.; "Design of Capacity-Approaching Irregular Low-Density Parity-Check Codes"; in: IEEE Translations on Information Theory; vol. 47, No. 2, pp. 619-637; Feb. 2001.
Robert G. Gallager; "Low-Density Parity-Check Codes"; 1963.

(Continued)

*Primary Examiner* — Hashem Farrokh
(74) *Attorney, Agent, or Firm* — Mirna Abyad; Wade J. Brady, III; Frederick J. Telecky, Jr.

(57) ABSTRACT

A digital signal processor (DSP) co-processor according to a clustered architecture with local memories. Each cluster in the architecture includes multiple sub-clusters, each sub-cluster capable of executing one or two instructions that may be specifically directed to a particular DSP operation. The sub-clusters in each cluster communicate with global memory resources by way of a crossbar switch in the cluster. One or more of the sub-clusters has a dedicated local memory that can be accessed in a random access manner, in a vector access manner, or in a streaming or stack manner. The local memory is arranged as a plurality of banks. In response to certain vector access instructions, the input data may be permuted among the banks prior to a write, or permuted after being read from the banks, according to a permutation pattern stored in a register.

15 Claims, 8 Drawing Sheets

OTHER PUBLICATIONS

Thomas J. Richardson, et al.; "Efficient Encoding of Low-Density Parity-Check Codes"; Feb. 2001.

David J. C. MacKay et al.; "Comparison of Constructions of Irregular Gallager Codes" Oct. 1999.

Tong Zhang et al.; "VLSI Implementation-Oriented (3, k)-Regular Low-Density Parity-Check Codes"; 2001.

PCT Search Report—PCT/US2008/082051 dated Mar. 31, 2009.

* cited by examiner

LOCAL MEMORIES WITH PERMUTATION FUNCTIONALITY FOR DIGITAL SIGNAL PROCESSORS

CROSS-REFERENCE TO RELATED APPLICATIONS

This application is a continuation-in-part of copending application Ser. No. 11/930,958, filed 31 Oct. 2007, and as such claims the benefit of the filing date of that application under 35 U.S.C. §120.

STATEMENT REGARDING FEDERALLY SPONSORED RESEARCH OR DEVELOPMENT

Not applicable.

BACKGROUND OF THE INVENTION

Embodiments of this invention are applicable to the field of programmable digital logic circuitry; more specifically, embodiments of this invention are directed to memory architecture in digital signal processors.

The technology of digital signal processing has become commonplace in modern electronic systems and applications of such systems. Digital signal processing techniques are widely used in communications technologies, including the wireless technologies of cellular telephony, wireless networking ranging from short range approaches (e.g., "Bluetooth"), local area networking (wireless LANs, or "WiFi"), and "metro" area networks implemented via "WiFi" or the like; wireline communications, such as digital subscriber line (DSL), high-speed Internet access via cable networks, and Ethernet network communications also apply digital signal processing techniques. Digital signal processing is also widely used in such other various applications as digital audio systems, digital video systems, hearing aids, and numerous other real-time computing applications.

Special purpose microprocessors designed for efficiently handling certain arithmetic and logic operations that are repeatedly performed in digital signal processing (e.g., multiply-and-accumulate) are now widely used. Examples of such digital signal processors ("DSP") that are popular in the industry include the TMS320XC64x family of digital signal processors ("DSPs") available from Texas Instruments Incorporated. Modern DSPs, such as that "C64x" family, are realized by Very Long Instruction Word (VLIW) processor architectures. FIG. 1 illustrates the architecture of data memory and functional units in the C64x family of DSPs, according to which two sets 2 of four processing units each are provided. As shown in this example, each set 2 includes a logical unit (L1; L2), a shifter unit (S1; S2), a multiplier (M1; M2), and a data load/store unit (D1; D2). Set $2_1$ (L1, S1, M1, D1) is associated with dedicated register file $4_1$, and set $2_2$ (L2, S2, M2, D2) is associated with dedicated register file $4_2$. Global data memory 6 is available to both of sets $2_1$, $2_2$, and is accessible via their respective data units D1, D2. In this architecture, a maximum of eight instructions can be simultaneously executed per machine cycle, one instruction by each of the eight functional units. Of course, instruction execution at this maximum rate requires that the particular instructions being simultaneously executed match the functional unit types available (i.e., eight load/store operations cannot be performed simultaneously). In addition, the bandwidth of each of the register files $4_1$, $4_2$ must be shared among its associated functional units, although the latency of accesses to register files 4 will be much shorter than the latency for accesses to data memory 6.

Complex digital signal processing routines are now often involved in meeting the real-time demands of modern communications applications. One example of such critical path digital signal processing is the decoding involved in error correction of received signals. Low Density Parity Check (LDPC) decoding, "turbo" decoding, Viterbi decoding, and the like are examples of complicated and iterative processing routines that are now typically applied to relatively large data block sizes, and that can limit the overall data rates of the received communications. The Kasumi cipher, required for "3G" cellular communications, is another example of a complex and repetitive DSP routine. Other complex digital signal processing routines are involved in MIMO communications, and in channel estimation and equalization in several communications approaches. Discrete Fourier Transforms (DFTs) and Fast Fourier Transforms (FFTs) on large data block sizes are now commonplace in many applications.

The memory size and memory bandwidth in the conventional architecture of FIG. 1 has been observed, in connection with this invention, to especially constrain system performance in certain complex yet common DSP functions. For example, a typical 1200-point DFT requires up to 1200 separate "twiddle" factors, each of which must be retrieved from some memory resource and arithmetically applied to a data word. Another such function is a typical Kasumi cipher application, which involves two tables of random numbers, each of 128 to 512 elements. Local register files such as register files 4 of FIG. 1 are typically not sufficiently large to store such a large number of values; as such, data memory 6 must be accessed, repeatedly, in order for the architecture of FIG. 1 to perform its DFT or Kasumi task, in these examples. But the retrieval of these values from global data memory 6 adversely affects algorithm performance, considering the latency (i.e., number of machine cycles) for accessing these values from global data memory 6, and considering the necessity to involve the load/store function units D1, D2 along with the functional unit executing the instruction. In addition, global data memory 6 is shared by both sets 2 of functional units, and as such the bandwidth into and out of memory 6 is similarly shared, leading to further increases in latency and thus slower performance. Worse yet, some digital signal processing operations involved in LDPC decoding, matrix algebra, turbo decoding, and Kasumi processing require that data be read or written by way of some permuted sequence of addresses. Such permutations substantially reduce the efficiency memory access, because the ability to access contiguous memory addresses (i.e., in the same physical row of the memory) is not available in such cases.

BRIEF SUMMARY OF THE INVENTION

It is therefore an object of this invention to provide memory resources in a digital system and a method of operating the same that improves the efficiency of access by functional units in a programmable digital logic integrated circuit.

It is a further object of this invention to provide such a system and method in which multiple memory resources are provided for multiple functional units, thus improving pipelining in digital signal processing routines.

It is a further object of this invention to provide such a system and method in which memory access can be efficiently made according to permutation patterns.

It is a further object of this invention to provide such a system and method in which the memory resources can be accessed by way of random access operations, or by way of stack operations.

Other objects and advantages of this invention will be apparent to those of ordinary skill in the art having reference to the following specification together with its drawings.

The present invention may be implemented into a programmable digital logic integrated circuit, and method of operating the same, including functional units such as arithmetic and logic units arranged in subclusters within clusters. Each cluster includes a crossbar switch to enable communication among its subclusters, and one or more of the subclusters are arranged as a pair of functional units and a register file. One of the subclusters within a given cluster serves as a load/store unit for storing and retrieving data in and from global memory. One or more of the functional subclusters within each cluster is associated with a local memory resource. The local memory is a non-cached memory that can be accessed as random access memory, or as a stack or FIFO.

According to another aspect of the invention, the local memory resource is configured as multiple banks of memory, each bank separately addressable by way of a vector address. Permutation circuitry is provided at the input to the memory, so that input data can be written into the banks according to a pattern in a permutation register; permutation circuitry is also provided at the output from the memory, so that data read from the various banks can be permuted at the memory output according to a pattern in a permutation register.

DETAILED DESCRIPTION OF THE INVENTION

The present invention will be described in connection with its preferred embodiment, namely as implemented into a digital signal processing (DSP) subsystem, for example as realized in a communications system such as a wireless network adapter, a cellular telephone handset, or the like. However, it is contemplated that this invention may be realized in a wide range of systems and system applications, particularly those in which digital signal processing operations are useful if not dominant in the overall system function. Accordingly, it is to be understood that the following description is provided by way of example only, and is not intended to limit the true scope of this invention as claimed.

Figure 1:
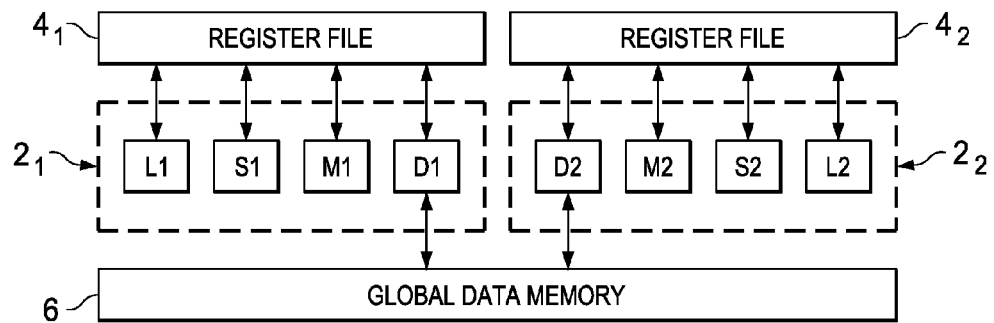
FIG. 1 is an electrical diagram, in block form, of the architecture of a conventional digital signal processor integrated circuit.
Figure 2:
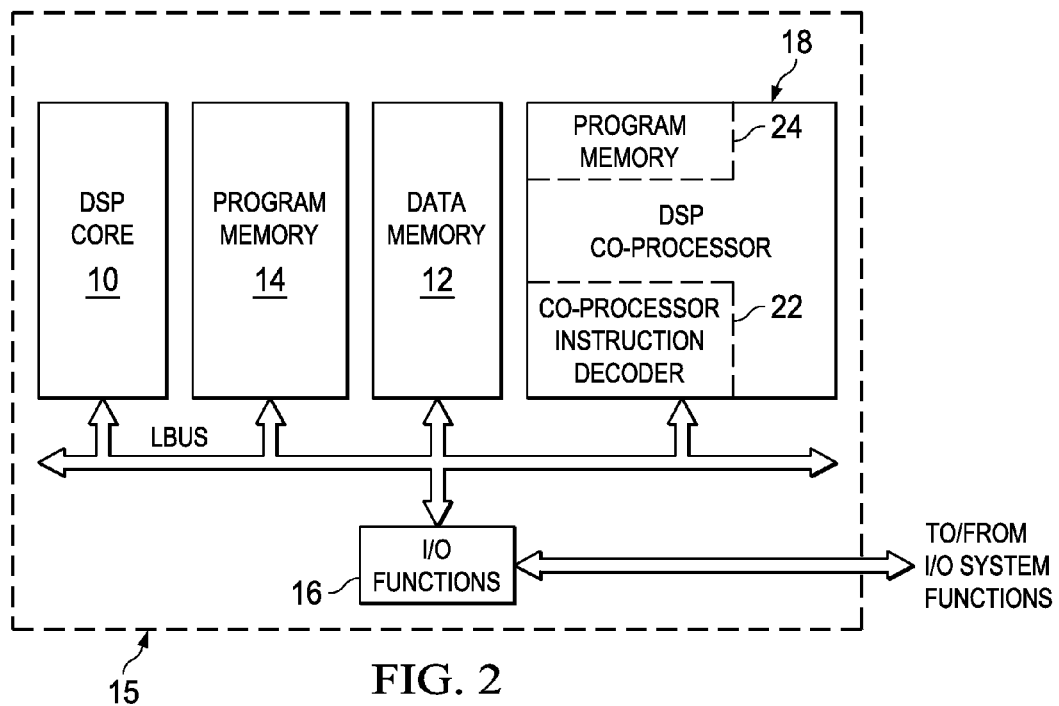
FIG. 2 is an electrical diagram, in block form, of the architecture of a digital system constructed according to an embodiment of the invention.

Referring now to FIG. 2, the architecture of an example of a digital signal processing (DSP) subsystem 15 according to an embodiment of the invention will now be described in further detail. According to this embodiment of the invention, DSP subsystem 15 may be realized within a single large-scale integrated circuit, or alternatively by way of two or more individual integrated circuits, depending on the available technology and system requirements.

DSP subsystem 15 includes DSP core 10, which is a full performance digital signal processor (DSP) such as a member of the C64x family of digital signal processors available from Texas Instruments Incorporated. As known in the art, this family of DSPs are of the Very Long Instruction Word (VLIW) type, for example capable of pipelining eight simple, general purpose, instructions in parallel. This architecture has been observed to be particularly well suited for operations involved in the modulation and demodulation of large data block sizes, as involved in digital communications. In this example, DSP core 10 is in communication with local bus LBUS, to which data memory resource 12 and program memory resource 14 are connected in the example of FIG. 2. Of course, data memory 12 and program memory 14 may alternatively be combined within a single physical memory resource, or within a single memory address space, or both, as known in the art; further in the alternative, data memory 12 and program memory 14 may be realized within DSP core 10, if desired. Input/output (I/O) functions 16 are also provided within DSP subsystem 15, in communication with DSP core 10 via local bus LBUS. Input and output operations are carried out by I/O functions 16, for example to and from a host interface if DSP subsystem 15 is a subsystem within a larger digital system, or to and from a digital up/down conversion function in a communications system, or to and from such other system functions as applicable to the system application of subsystem 15.

According to this preferred embodiment of the invention, DSP co-processor 18 is also provided within DSP subsystem 15, and is also coupled to local bus LBUS. DSP co-processor 18 is realized by programmable logic for carrying out the iterative, repetitive, and perhaps parallelized, operations involved in particular computationally intensive functions to be executed by DSP subsystem 15. For example, DSP co-processor 18 may be arranged to carry out LDPC decoding of data received over a communications facility (and, to the extent applicable, the LDPC encoding of data to be transmitted), as described in commonly assigned and copending U.S. application Ser. No. 11/930,958, filed 31 Oct. 2007, entitled "Sign Operation Instructions and Circuitry", incorporated herein by reference. Another example of an application and construction of DSP co-processor 18 is encryption and decryption of digital data according to the Kasumi cipher, for which a DSP co-processor with specific logic is described in commonly assigned and copending U.S. application Ser. No. 12/332,306, filed 10 Dec. 2008, entitled "Kasumi Cipher Executable Instructions and Circuitry", incorporated herein by reference. In each of these examples, specific logic circuitry is provided within DSP co-processor 18, for execution of specific instructions for particular functions of LDPC decoding and Kasumi cipher evaluation. Alternatively, DSP co-processor 18 may be arranged in a somewhat more general sense, providing logic circuitry arranged to carry out conventional DSP operations, such as multiply-and-accumulate, Fast Fourier Transforms (FFT) or Discrete Fourier Transforms (DFTs) and their inverses, and the like. In any event, DSP co-processor 18 appears to DSP core 10 as a traditional co-processor. In this arrangement, DSP core 10 accesses DSP co-processor 18 by forwarding to it higher-level instructions (e.g., DECODE) for execution, along with a pointer to data memory 12 for the data upon which that instruction is to be executed, and a pointer to the destination location in data memory 12 at which the results of the decoding are to be stored.

Alternatively, the particular architecture of DSP co-processor 18 to be described below may instead realize DSP core 10 itself. In any event, it is to be understood that the description of this invention in connection with DSP co-processor 18 is provided by way of example only, and is not intended to be limiting in any way.

According to this preferred embodiment of the invention, DSP co-processor 18 includes its own program memory 24, which stores instruction sequences that DSP co-processor 18 is to execute in carrying out specific operations in DSP subsystem 15. As discussed above, these operations will depend on the purpose of DSP-co-processor 18; examples of such operations include LDPC decoding, matrix algebra, FFT/DFT and inverses, turbo decoding, Viterbi decoding, evaluation of Kasumi cipher relative to data blocks, digital filter algorithms, and the like. DSP co-processor 18 also includes data memory resources or data stores, for storing data and results of its operations, as will be described in detail below. In addition, DSP co-processor 18 includes the necessary control circuitry for fetching, decoding, and executing instructions and data involved in its operations, for example in response to the higher-level instructions from DSP core 10. For example, as shown in FIG. 2, DSP co-processor 18 includes instruction decoder 22, for decoding instructions fetched from its program memory 24 or forwarded from DSP core 10. The logic circuitry contained within DSP co-processor 18 includes such arithmetic and logic circuitry necessary and appropriate for executing its instructions, and also the necessary memory management and access circuitry for retrieving and storing data from and to data memory 12, as will be described in further detail below.

Figure 3:
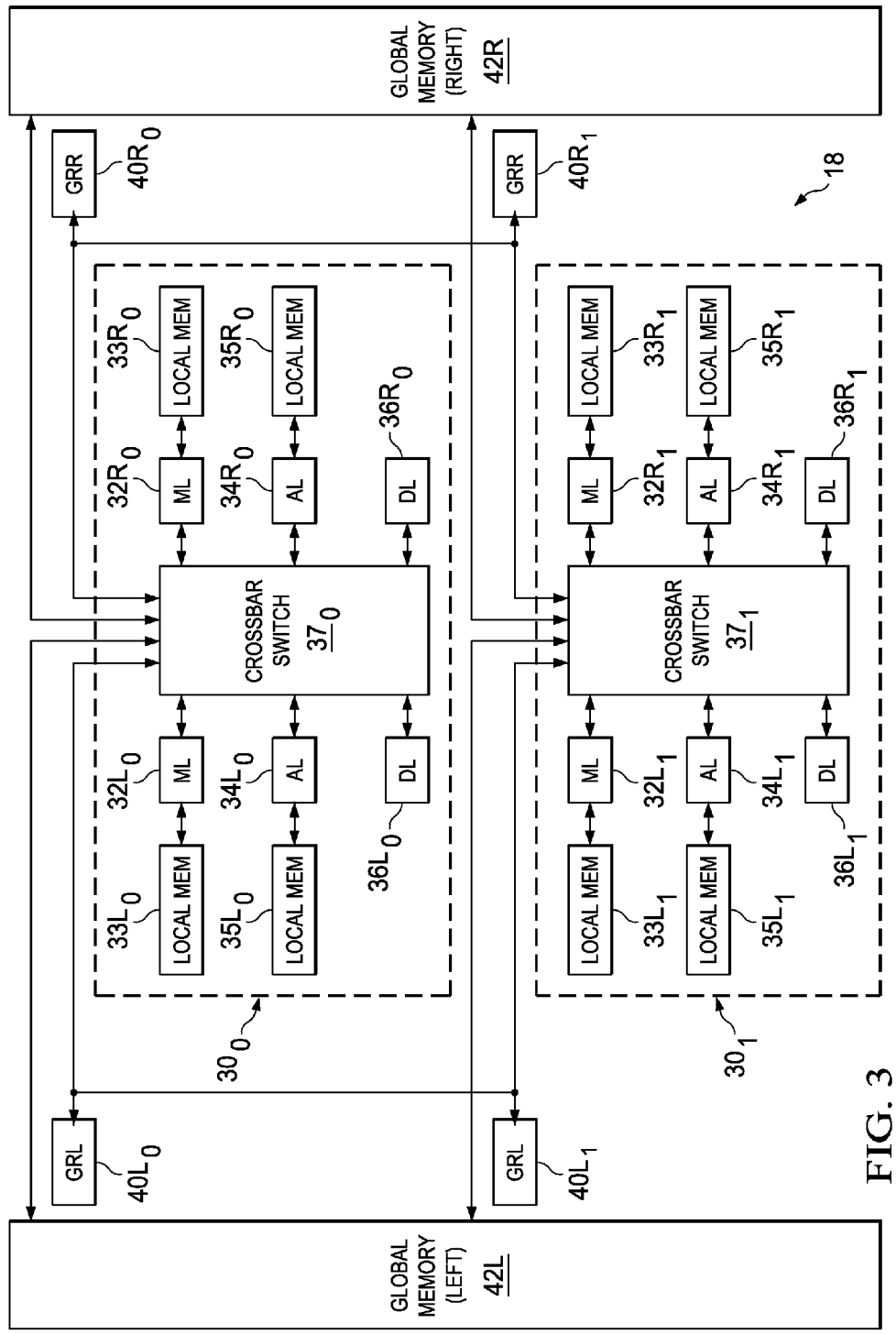
FIG. 3 is an electrical diagram, in block form, of the architecture of a digital signal processor arranged as a co-processor in the system of FIG. 2, according to an embodiment of the invention.

Referring now to FIG. 3, the architecture of DSP co-processor 18 according to a preferred implementation of DSP subsystem 15 of FIG. 2, and constructed according to the preferred embodiments of this invention, will now be described in further detail. According to this embodiment of the invention, the architecture of DSP co-processor 18 is cluster-based, in that multiple processing clusters 30 are provided within DSP co-processor 18, such clusters 30 being in communication with one another, and in communication with memory resources such as global memories 42L, 42R. FIG. 3 shows two similarly constructed clusters $30_0$, $30_1$ by way of example; it is contemplated that a modern implementation of DSP co-processor 18 will typically include two or more clusters 30. In FIG. 3, each of clusters $30_0$, $30_1$ is connected to global memory (left) 42L and to global memory (right) 42R, and as such can store and retrieve data to and from each of those memory resources. In this embodiment of the invention, global memories 42L, 42R are realized within DSP co-processor 18 itself. Alternatively, global memories 42L, 42R may be realized as part of data memory 12 (FIG. 2), in which case memory management or bus management circuitry would be provided within DSP co-processor 18 to communicate with those resources via local bus LBUS.

By way of example (it being understood that cluster $30_1$ is similarly constructed), cluster $30_0$ contains six sub-clusters $32L_0$, $34L_0$, $36L_0$, $32R_0$, $34R_0$, $36R_0$. According to this implementation, each sub-cluster $32L_0$, $34L_0$, $36L_0$, $32R_0$, $34R_0$, $36R_0$ is capable of executing generalized arithmetic or logic instructions, but is also specifically constructed to perform certain instructions with particular efficiency. For example, as suggested by FIG. 3, sub-clusters $32L_0$ and $32R_0$ are multiplying units and as such include multiplier circuitry; sub-clusters $34L_0$ and $34R_0$ are arithmetic units with particular efficiencies for certain arithmetic and logic instructions; and sub-clusters $36L_0$, $36R_0$ are data units constructed to especially be efficient in executing data load and store operations relative to memory resources outside of cluster $30_0$.

Figure 4:
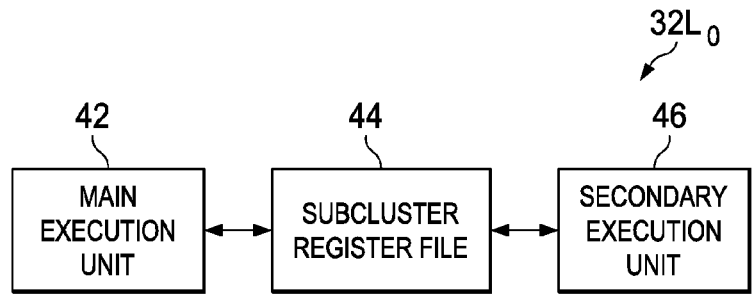
FIG. 4 is an electrical diagram, in block form, of the construction of an execution unit in the co-processor architecture of FIG. 3 according to embodiments of the invention.

According to this implementation, each sub-cluster $32L_0$, $34L_0$, $36L_0$, $32R_0$, $34R_0$, $36R_0$ is itself realized by multiple execution units. By way of example, FIG. 4 illustrates the construction of sub-cluster $32L_0$; it is to be understood that the other sub-clusters $34L_0$, $36L_0$, $32R_0$, $34R_0$, $36R_0$ are similarly constructed, yet with individual differences in their specific circuitry dedicated to the function (multiplier, arithmetic, data) for that sub-cluster. As shown in FIG. 4, this example of sub-cluster $32L_0$ includes main execution unit 42, secondary execution unit 46, and sub-cluster register file 44 accessible by each of main execution unit 42 and secondary execution unit 46. As such, each of sub-clusters $32L_0$, $34L_0$, $36L_0$, $32R_0$, $34R_0$, $36R_0$ is capable of executing two instructions simultaneously, and capable of two independent accesses to sub-cluster register file 44 within the same machine cycle. As a result, referring back to FIG. 3, because six sub-clusters $32L_0$, $34L_0$, $36L_0$, $32R_0$, $34R_0$, $36R_0$ are included within cluster $30_0$, cluster $30_0$ is capable of executing twelve instructions simultaneously, assuming no memory or other resource conflicts.

According to embodiments of the invention, dedicated logic circuitry for performing various operations, for example as described in copending U.S. application Ser. No. 11/930,958 and Ser. No. 12/332,306, incorporated herein by this reference, can be implemented in each of main execution unit 42 and secondary execution unit 46, in one or more of sub-clusters $32L_0$, $34L_0$, $36L_0$, $32R_0$, $34R_0$, $36R_0$ in cluster $30_0$, and also in one or more of sub-clusters $32L_1$, $34L_1$, $36L_1$, $32R_1$, $34R_1$, $36R_1$ of cluster $30_1$. Accordingly, as evident from this description, a very high degree of parallelism can be attained by the architecture of DSP co-processor 18 according to these preferred embodiments of the invention.

As shown in FIG. 3, each sub-cluster 32, 34, 36 in cluster $30_0$ is bidirectionally connected to crossbar switch $37_0$. Crossbar switch $37_0$ manages the communication of data into, out of, and within cluster $30_0$, by coupling individual ones of the sub-clusters 32, 34, 36 to another sub-cluster within cluster $30_0$, or to a memory resource. As discussed above, these memory resources include global memory (left) 42L and global memory (right) 42R. As evident from FIG. 3, each of clusters $30_0$, $30_1$ (more specifically, each of sub-clusters 32, 34, 36 therein) can access each of global memory (left) 42L and global memory (right) 42R, and as such global memories 42L, 42R can be used to communicate data among clusters 30. Preferably, the sub-clusters 32, 34, 36 are split so that each sub-cluster can access one of global memories 42L, 42R through crossbar switch 36, but not the other. For example, referring to cluster $30_0$, sub-clusters $32L_0$, $34L_0$, $36L_0$ may be capable of accessing global memory (left) 42L but not global memory (right) 42R; conversely, sub-clusters $32R_0$, $34R_0$, $36RL_0$ may be capable of accessing global memory (right) 42R but not global memory (left) 42L. This assigning of sub-clusters 32, 34, 36 to one but not the other of global memories 42L, 42R may facilitate the physical layout of DSP co-processor 18, and thus reduce cost.

According to this architecture, global register files 40 provide rapid data communication among clusters 30. As shown in FIG. 3, global register files $40L_0$, $40L_1$, $40R_0$, $40R_1$ are connected to each of clusters $30_0$, $30_1$, specifically to crossbar switches $37_0$, $37_1$, respectively, within clusters $30_0$, $30_1$. Global register files 40 include addressable memory locations that can be rapidly written and read in fewer machine cycles than in accesses to global memories 42L, 42R. For example, it is contemplated that two machine cycles are required to write a data word into a location of global register file 40, and one machine cycle is required to read a data word from a location of global register file 40; in contrast, it is contemplated that as many as seven machine cycles are required to write data into, or read data from, a location in global memories 42L, 42R. Accordingly, global register files 40 provide a rapid path for communication of data from cluster-to-cluster, for example by a sub-cluster in one cluster 30 writing data into a location of one of global register files 40, and a sub-cluster in another cluster 30 reading that data from that location. Global register files 40 must be kept relatively small in size, however, to permit such high-performance access.

Referring again to FIG. 3, according to embodiments of this invention, local memory resources are included within each of clusters $30_0$, $30_1$. For example, referring to cluster $30_0$, local memory resource $33L_0$ is bidirectionally coupled to sub-cluster $32L_0$, local memory resource $35L_0$ is bidirectionally coupled to sub-cluster $34L_0$, local memory resource $33R_0$ is bidirectionally coupled to sub-cluster $32R_0$, and local memory resource $35R_0$ is bidirectionally coupled to sub-cluster $34R_0$. Each of these local memory resources 33, 35 is associated only with its associated sub-cluster 32, 34, respectively. As such, each sub-cluster 32, 34 can very rapidly write to and read from its associated local memory resource 33, 35, for example within a single machine cycle. Local memory resources 33, 35 are therefore useful for storage of processing parameters and intermediate results in larger-scale DSP operations.

In the context of DSP co-processor 18 of the architecture illustrated in FIG. 3, local memory resources 33, 35 are especially useful for storing digital filter coefficients, storing and holding FFT parameters, storing tables of pseudo-random values as useful in the Kasumi cipher algorithms, and the like. In addition, local memory resources 33, 35 are particularly useful in LDPC decoding, for example in storing the branch metric and LLR values utilized in that operation. According to this embodiment of the invention, these local memory resources 33, 35 are each arranged in multiple banks of addressable memory that can be accessed in "vector" fashion, with each bank receiving a different memory address, yet writing or reading data to or from all banks simultaneously. Local memory resources 33, 35 according to this embodiment of the invention can also be used in the program memory context, because of its capability of being accessed in a "streaming" or stack mode, which enables local memory resources 33, 35 to act as a stream buffer to connect multiple concurrent blocks of program code. A permutation capability is also provided by local memory resources 33, 35, as will be described in detail below, which enables the efficient transforming and shuffling of data in various operations such as "corner turn" operations in matrix algebra and two-dimensional permutation. It is contemplated that those skilled in the art having reference to this specification will comprehend other uses and benefits of local memory resources 33, 35, especially in the architecture of DSP co-processor 18 shown in FIG. 3.

Figure 5:
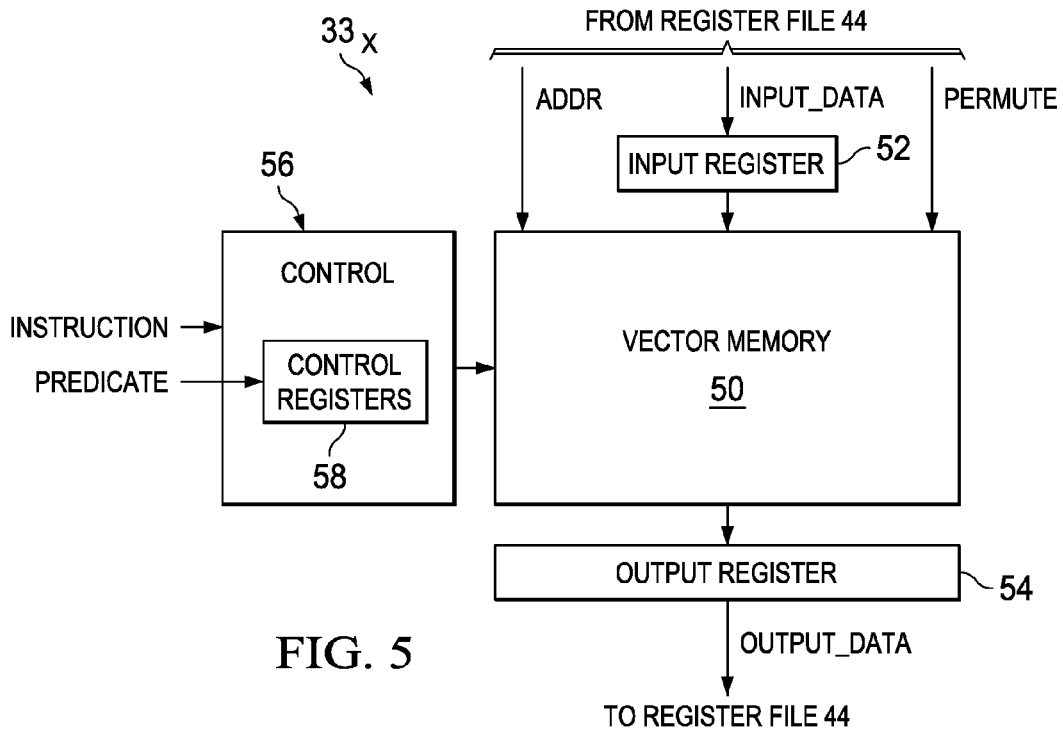
FIG. 5 is an electrical diagram, in block form, of the construction of a local memory in the co-processor architecture of FIG. 3 according to embodiments of the invention.

FIG. 5 illustrates the construction of an instance of local memory resources 33, 35, with reference to local memory resource $33_x$. It is contemplated that each of memory resources, 33, 35 in DSP co-processor 18 will be constructed similarly as local memory resource $33_x$ of FIG. 5; alternatively, one or more of the other memory resources 33, 35 may be constructed according to some other memory architecture, if desired. It is further contemplated, however, that the architecture of local memory resource $33_x$ illustrated in FIG. 5 will be particularly beneficial and efficient in the execution of many DSP software routines.

As shown in FIG. 5, local memory resource $33_x$ includes vector memory 50, which corresponds to an array of memory cells and associated decoder logic. As will be described in further detail below, vector memory 50 is arranged as multiple parallel "banks", for example as sixteen banks of 512 addressable eight-bit (byte) locations. According to this embodiment of the invention, local memory resource $33_x$ responds to instructions provided to it by its corresponding functional unit 32, 34. In the architecture of FIG. 5, control logic 56 is provided within local memory resource $33_x$, and includes the appropriate control logic for receiving and decoding instruction opcodes and controlling vector memory 50 to execute the memory access instruction. Control logic 56 can be realized by conventional controller logic as used in microprocessors and the like, for example by way of a control ROM or alternatively by way of dedicated logic circuitry. Each instruction received and decoded by control logic 56 indicates the type of operation (read, write) to be executed by local memory resource $33_x$, the access mode (random access or stack access; byte-alignment; etc.), the data width of the access relative to the thirty-two bit word size (i.e., selecting from among byte, half-word, word, double word, or quad word data widths), and identification of the registers in the register file 44 of its associated functional unit 32, 34 that specify the address vector, the input data, any permutation pattern to be applied, and the destination of the output data for a read operation.

Other "predicates" applicable to the instruction are received from the associated functional unit 32, 34, and stored in various control registers 58 within control logic 56. More particularly, as will be described in further detail below, control registers 58 include registers that define the size and read/write starting addresses of circular buffers that can be realized by local memory resource $33_x$, when operating in its streaming mode.

As shown in FIG. 5, vector memory 50 receives an address value from one or more registers in register file 44, and a permutation pattern (if applicable) from another register in register file 44. For write operations, whether in random access or streaming (stack) modes, one or more registers in register file 44 provides input data that are received by input register 52 of local memory resource $33_x$. For read operations, whether in random access or streaming modes, output register 54 receives and buffers the data accessed from vector memory 50, for eventual forwarding to one or more registers in register file 44.

Figure 6:
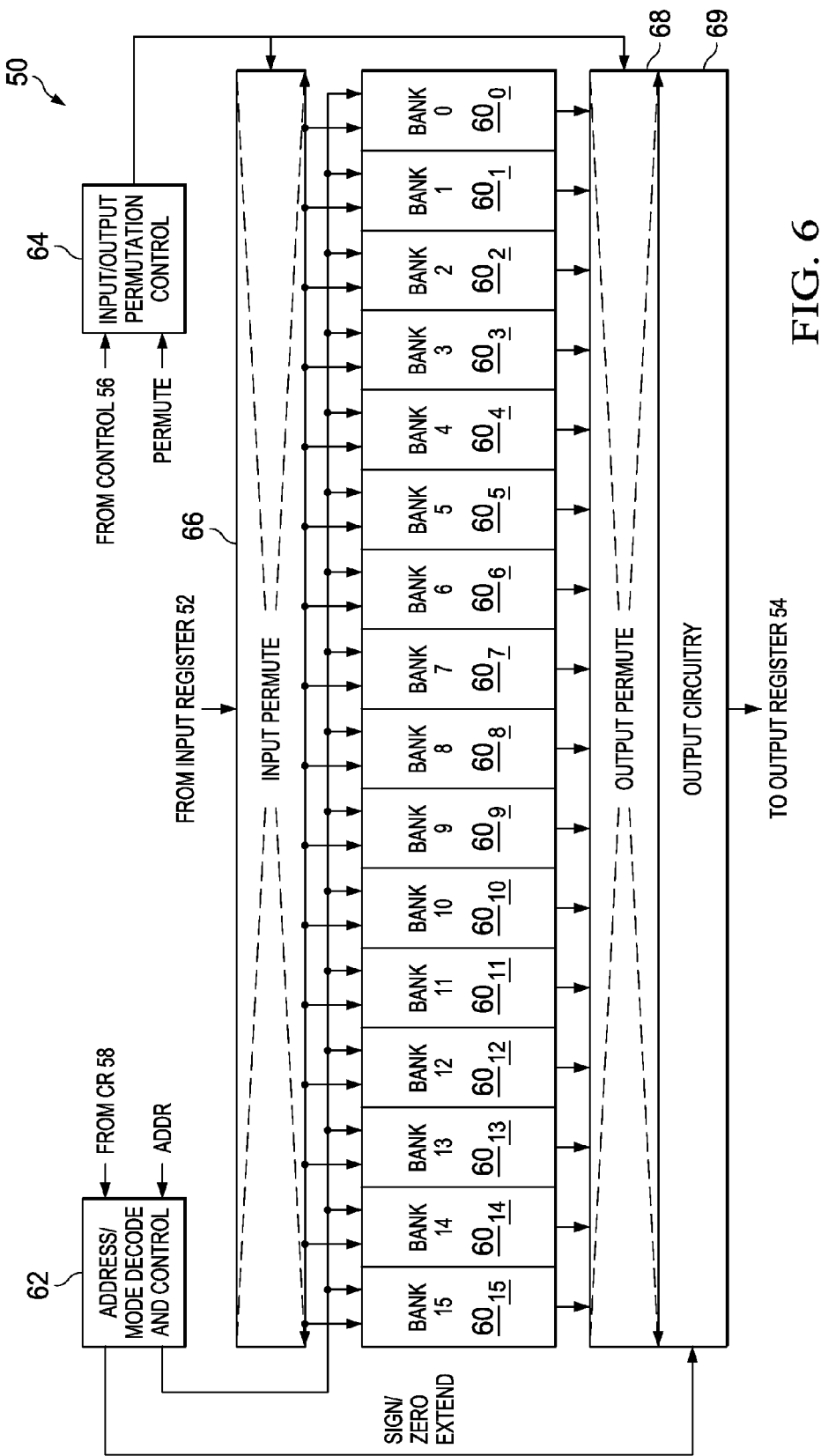
FIG. 6 is an electrical diagram, in block form, of the vector memory in the local memory of FIG. 5, according to embodiments of the invention.

FIG. 6 illustrates the construction of vector memory 50 in local memory resource $33_x$, according to this embodiment of the invention. As shown in FIG. 6, this example of vector memory 50 includes memory array 60, which is arranged as sixteen banks $60_0$ through $60_{15}$. It is contemplated that memory banks $60_0$ through $60_{15}$ will be realized by way of static random access memory (RAM), each including a number of addressable locations of one or more bits in width. For example, each bank $60_x$ may include 512 addressable locations of one byte (eight bits) each, resulting in banks $60_0$ through $60_{15}$ collectively defining a memory of size 512 by 128 bits (i.e., sixteen bytes). Addressing of the various locations within banks $60_0$ through $60_{15}$ is effected by address/mode decode and control circuitry 62, which receives an address value from register file 44, along with control signals from one of control registers 58. As will be evident from the following description, the control signals from control registers 58 can control whether memory array 60 is addressed in a random access fashion, or alternatively in a streaming or stack mode. Address/mode decode and control circuitry 62 also issues a control signal on line sign/zero extend, by way of which the output data can be zero-filled, sign-extended, bytealigned, or otherwise modified by output circuitry 69 in response to an instruction or control signal from control registers 58.

According to this embodiment of the invention, the permutation of input data written to banks $60_0$ through $60_{15}$ can be accomplished by way of input permutation circuitry 66, and the permutation of data read from banks $60_0$ through $60_{15}$ can be accomplished by way of output permutation circuitry 68. As will be evident from the description below regarding the operation of vector memory 50, input permutation circuitry 66 and output permutation circuitry 68 can be realized by way of logic circuitry that can route data from one position to another in response to the contents of a register in register file 44, which is communicated to input/output permutation control circuitry 64 along with a signal from control logic 56 that enables permutation for either the input or output operations. It is contemplated that the routing of data by input and output permutation circuitry 66, 68 will be carried out on a bank-by-bank basis; in this example, when enabled, such permutation would route bytes of data from one bank position to another. It is contemplated that those skilled in the art having reference to this specification will be readily able to realize and output permutation circuitry 66, 68, respectively, by way of conventional logic circuitry, without undue experimentation.

In operation, as mentioned above, vector memory 50 may be addressed in various ways according to this embodiment of the invention. One example of the manner in which vector memory 50 may be addressed is simply by way of a single address value that addresses a common one of the addressable locations across each of banks $60_0$ through $60_{15}$. In this addressing mode, for the example of a 512 by 128 bit collective memory array 60, a nine-bit address would simultaneously select the same location in each of banks $60_0$ through $60_{15}$, causing a 128-bit read or write operation (depending on the desired operation as communicated to control logic 56) to those locations. In this example, the contents of a selected address source register in register file 44 would contain a nine-bit data value indicating that address, with the contents of a specified control register indicating a "quad-word" (i.e., four thirty-two bit words) access, and whether the access is a read or write. For example, a 128-bit read access may be made by execution of an instruction:

LUR1Q.<lm>, <address register>, <destination register> where <lm> indicates which of local memories 33, 35 is to be read, <address register> identifies the register in register file 44 at which the desired read address is stored, and <destination register> indicates the registers to which the data read from vector memory 50 are to be stored. Similarly, a quad-word (128-bit) write operation may be executed from an instruction:

LUW1Q.<lm>, <address register>, <source register> where <source register> indicates the registers storing the data to be written to the location of vector memory 50 indicated by the specified address register.

According to embodiments of this invention, vector memory 50 can also be addressed in a "streaming" or "stack" mode, as managed by control logic 56 in response to instructions requesting such access. In this streaming addressing mode, one or more address pointers are maintained in register file 44, each indicating a location in memory array 60 to which data are to be written (in a "push" operation) or from which data are to be read (in a "pop" operation). In addition, other registers in register file 44 can specify a size of a buffer corresponding to the address pointer, by way of which a "circular" buffer or a first-in-first-out (FIFO) buffer can be implemented in vector memory 50. The operation of vector memory 50 in this streaming mode will now be described in connection with FIG. 7*b*.

Figure 7:
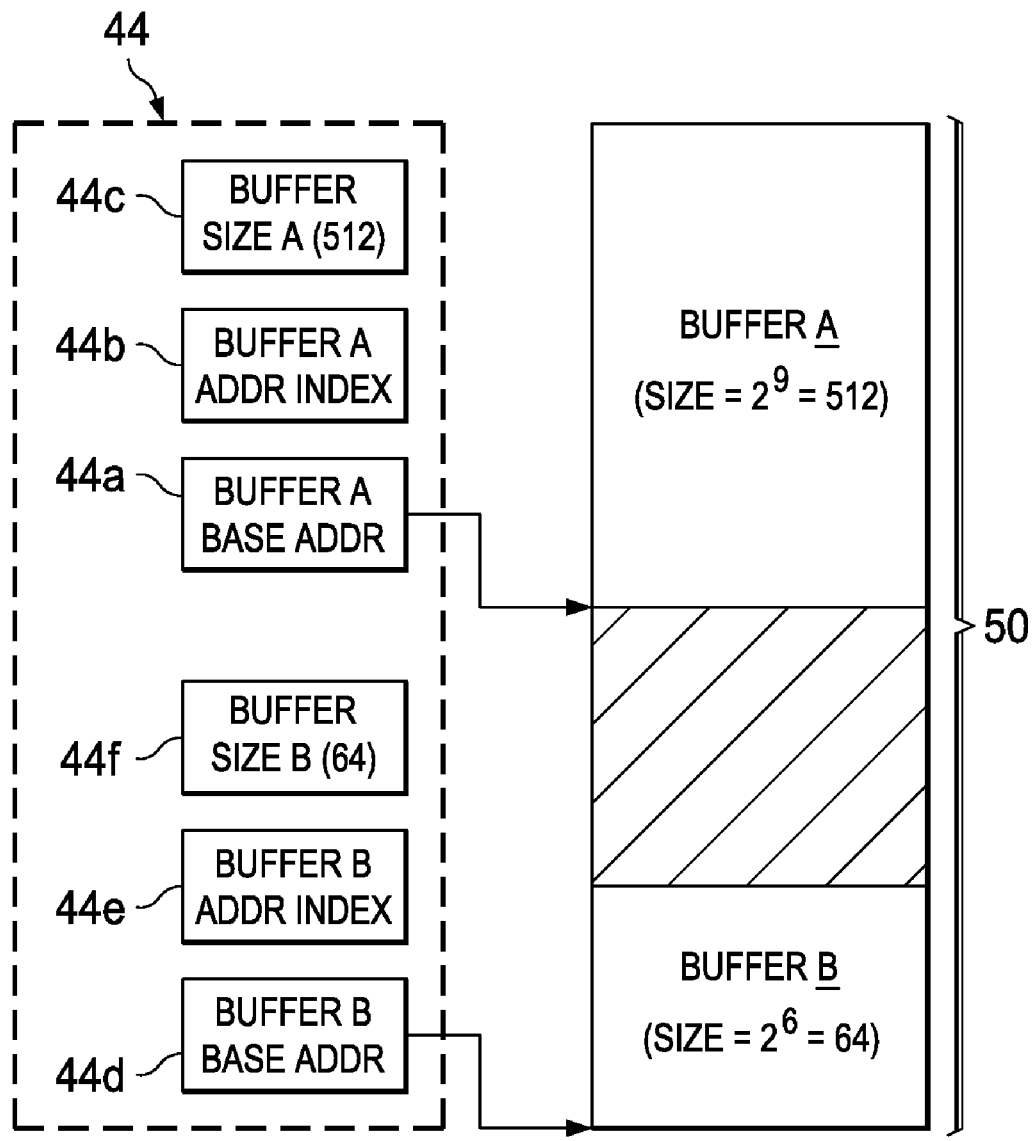
FIG. 7 is an electrical diagram, in block form, illustrating the operation of the vector memory of FIG. 6 in a streaming access mode, according to an embodiment of the invention.

In this example, two buffers A, B of differing size from one another are realized in vector memory 50. While FIG. 7 illustrates that these buffers A, B reside in non-overlapping portions of the vector memory 50 address space, it is contemplated that these buffers A, B may in fact overlap if desired; in this case, of course, the programmer should take care to maintain data coherency in the overlapping buffers. Registers in register file 44 are then assigned to define the attributes and operation of each buffer. For example, as shown in FIG. 7, the contents of register 44*a* indicate the base address of buffer A of vector memory 50; this base address value indicates the lowest address location in buffer A. Register 44*c* stores a value indicating the size (as a number of words, or as a number of addressable locations) of buffer A, such that the sum of the contents of register 44*a* and register 44*c* would point to the highest memory location in buffer B. Register 44*b* stores an address index value used to address locations in buffer A, in an indexed addressing mode. For example, a "push" operation to buffer B will write the data operand to a memory location indicated by the contents of register 44*b*, relative to the base address value stored in register 44*a*. Registers 44*d*, 44*e*, 44*f* provide the same functions of base address, address index, and buffer size storage for buffer B in this example of FIG. 7. The initial values of registers 44*a* through 44*f*, and indeed any of registers in register file 44 used to control the operation of vector memory 50, can be written by way of conventional register write operations.

Variations on the manner in which buffers A, B are accessed in vector memory in this streaming access mode are contemplated to be available according to embodiments of this invention. For example, the "push" or "pop" instruction can be applied in combination with a predicate value indicating that the address index stored in the corresponding address index register 44*b*, 44*e* is to be auto-incremented or auto-decremented upon execution. Alternatively, an immediate operand may be provided as part of the "push" or "pop" instruction statement or opcode, with that operand added (or subtracted) from the current value of the contents of the corresponding address index register 44*b*, 44*e*. In this arrangement, regardless of the manner in which index registers 44*b*, 44*e* are incremented or decremented, buffers A, B can operate in the form of "circular" buffers, in that upon the contents of the index value reaching either zero or the buffer size, those contents will "wrap around" within the bounds established by the specified buffer size.

In this streaming mode as circular buffers, buffers A, B can rapidly store and output data in a last-in-first-out manner. Another analogue to this type of operation is that of a "stack", in that a "push" operation writes a data value to the top of the stack, and a "pop" operation destructively reads that data value from the top of the stack.

Alternatively, buffers A, B can be defined as FIFO (first-in-first-out) buffers by using two address index buffers, the contents of one as a read address index and the contents of the other as a write address index. In this FIFO mode, buffers A, B can continue to operate as circular buffers, with the address index values wrapping around upon being decremented past zero or incremented past the buffer size value.

It is contemplated that different data widths can be read and written from vector memory 50 also in connection with the streaming or stack mode described above. For example, the "push" and "pop" operations may be selectably performed on 64-bit data elements (two double words) or 128-bit words (one quad word). Other variations on this streaming mode of access to vector memory 50 may alternatively or additionally be realized in practice.

Figure 8:
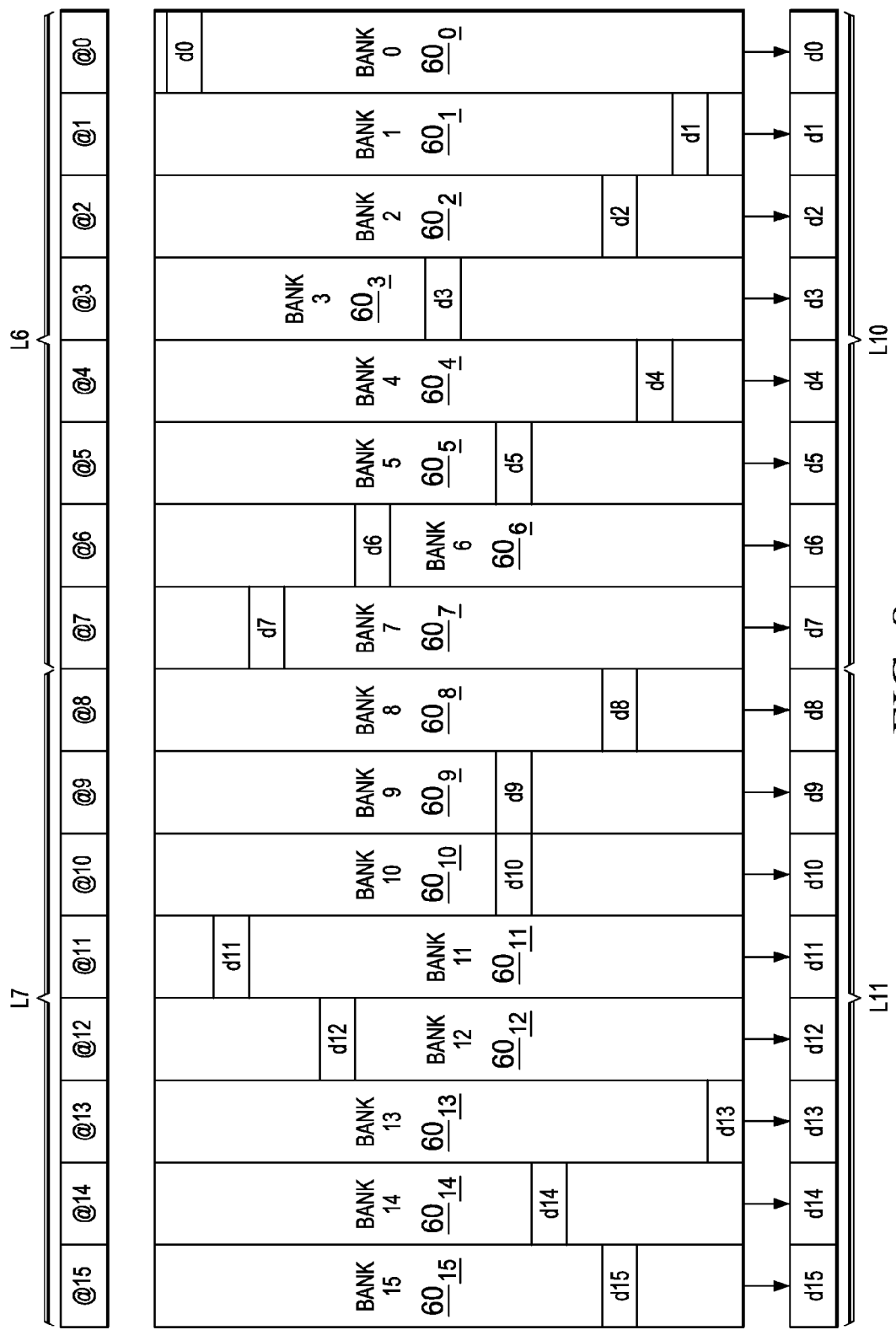
FIG. 8 is an electrical diagram, in block form, illustrating the operation of the vector memory of FIG. 6 in performing a vector read operation.

According to another access approach, vector memory 50 can be accessed in a "vector" fashion, in that different addresses can be applied to different banks $60_0$ through $60_{15}$. FIG. 8 illustrates this manner of access, for example in response to a read instruction:

LUR1B.<lm>, L7:L6, L11:L10

In this case, sixteen bytes are to be read from the selected memory (i.e., <lm>), from address locations specified for each of banks $60_0$ through $60_{15}$ in registers L7 and L6 of register file 44. The data read from banks $60_0$ through $60_{15}$ are to be stored in registers L11 and L10 of register file 44, as indicated in this instruction. In the example of FIG. 8, register L7 includes eight locations that, in order from most significant to least significant position within register L7, indicate the addresses within corresponding ones of banks $60_{15}$ through $60_8$, respectively, that are to be read upon execution of this instruction; register L6 similarly includes eight locations that indicate the addresses within respective banks $60_7$ through $60_0$ that are to be read. Also as shown in FIG. 8, the contents of banks $60_{15}$ through $60_8$ at the addresses indicated in the eight positions of register L7 are output into eight respective positions, from most significant to least significant position, of destination register L11. Similarly, the addressed contents of banks $60_7$ through $60_0$ as specified by the respective eight positions of register L6 are output into the eight positions of destination register L10.

Vector write operations to vector memory 50 can similarly be performed by execution of a similar instruction that specifies the source register of the various bytes to be written into the individually addressed positions of banks $60_0$ through $60_{15}$ as indicated by a pair of address registers.

The data granularity of such random access read, random access write, vector read, and vector write operations can vary, according to this embodiment of the invention. The examples of byte and quad-word accesses are described above. It is also contemplated that reads and writes can be made for data widths of half-words (sixteen bits), words (thirty-two bits), and double words (sixty-four bits), with up to eight half words, four words, and two double words simultaneously performed for a given instruction as executed at 128-bit wide vector memory 50.

In addition, it is contemplated that other variations on these operations can be implemented, and indicated by way of separate but independent instructions. For example, random access read and write operations can be performed in combination with automated operations on the data. One such variation involves accessing (e.g., read access) a specified address to retrieve less than 128 bits of data. For example, the instruction statement (human readable) or opcode (machine readable) for a read operation may specify only a single data element (byte, half-word, word, or double-word), rather than reading or writing parallel data elements of the specified data width. In this case, the opcode of a single read instruction may also specify that the retrieved data value be replicated over the remainder of the 128 bit output. Alternatively, the instruction statement or opcode may specify that the accessed data element be zero-extended, or sign-extended, over the remainder of the 128 bit output. FIG. 6 illustrates, by way of example, that the address/mode decode and control circuit 62 issues control signals on line sign/zero extend to output circuitry 69, which performs such sign- or zero-extension operations as indicated by the instruction statement or opcode, in the conventional manner.

According to embodiments of this invention, the vector read and vector write operations can be performed in combination with permutation of the data elements. As mentioned above in connection with FIG. 6, input permutation circuitry 66 and output permutation circuitry 68 route data from one position to another in response to the contents of a register in register file 44, such contents decoded by input/output permutation control circuitry 64 in combination with a permutation enable signal from control logic 56. In this example, the routing of data by input and output permutation circuitry 66, 68 is performed bank-by-bank, with bytes of data being routed from one bank position to another.

Figure 9:
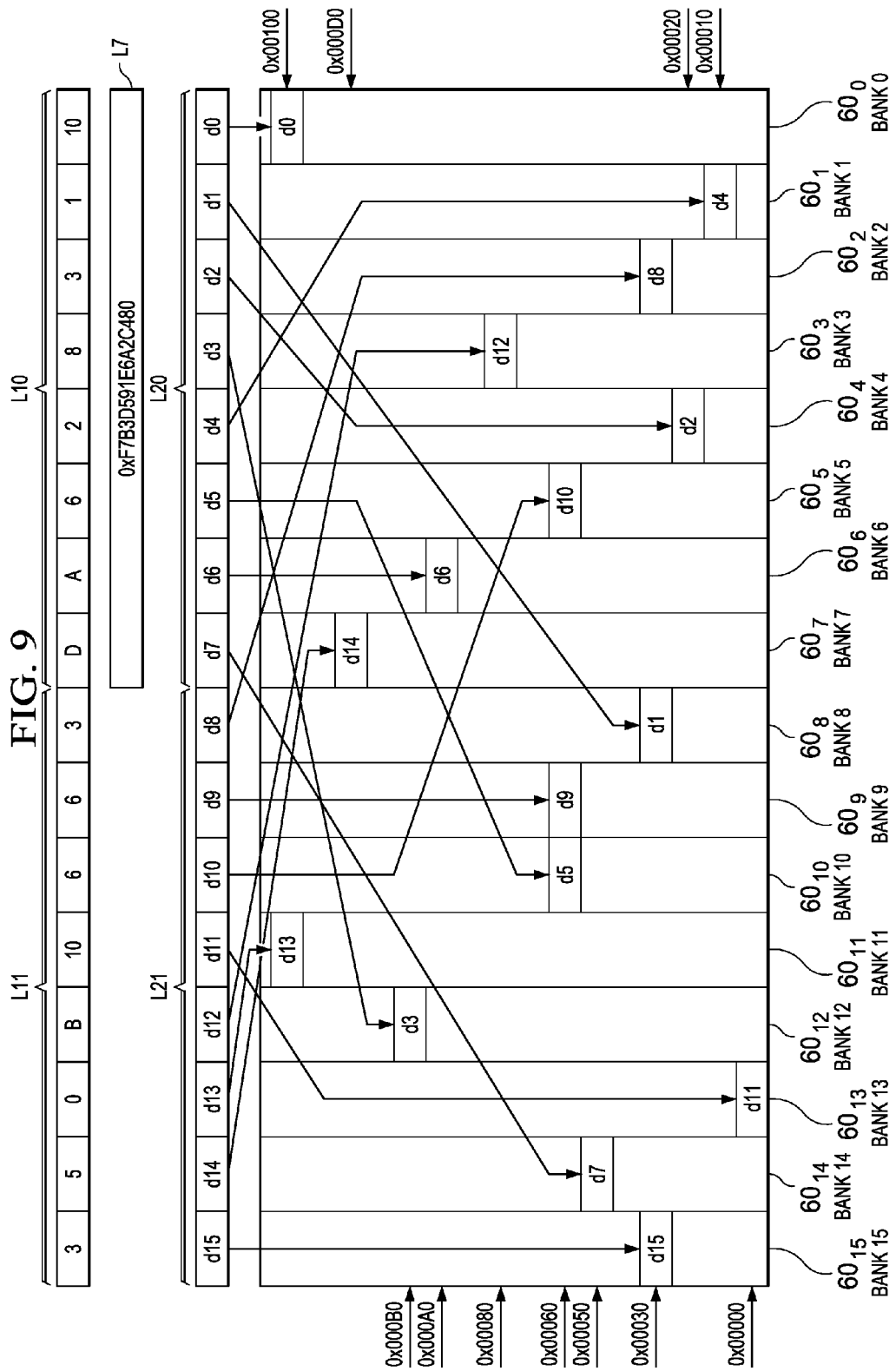
FIG. 9 is an electrical diagram, in block form, illustrating the operation of the vector memory of FIG. 6 in performing a permuted vector write operation.

FIG. 9 illustrates the operation of permutation by input permutation circuitry 66 for a permuted vector write operation executed by vector memory 50. An example of the instruction statement for the example of the vector write illustrated in FIG. 9 is:

LUWPERML16B.<lm>L21:20, L7, L11:L10

This instruction statement indicates that a sixteen-byte permuted write is to be performed to the local memory 33, 35 indicated by the operand <lm>, with registers L21 and L20 of register file 44 as the source registers of the input data to be written, the address vector residing in registers L11 and L10 of register file 44, and the permutation pattern stored in register L7 of register file 44. Of course, as noted above, these particular registers in register file 44 are general purpose registers, and as such each of these registers may serve as an address, source, destination, permutation, or other register function in the various instructions. In this example, because this instruction will write sixteen bytes into the permuted vector (i.e., 128 bits), the registers specifying the input data and the vector address are constructed as a concatenated pair of registers of 128 bits, each individual register being a sixty-four bit register.

In operation, the permutation carried out by input permutation circuitry 66 (FIG. 6) writes each input data byte from the source register, to the bank indicated by the corresponding entry in the permutation register for that byte of the source register, at the address within that bank indicated by the corresponding entry of the address register. In the example of FIG. 9, the least significant input data byte (d0) resides in the least significant byte position of the source register pair L21:L20. These input data are fetched from source registers L21:L20, and are retained in input register 52 in the order fetched. The contents of the specified permutation register L7, in this example, are forwarded to input permutation circuitry 66 as control signals, controlling the routing of the input data from input register 52 to the physical conductors and write circuitry (not shown) within memory array 60.

In the example of FIG. 9, permutation register L7 indicates, with a 0 in its least significant nibble (four bits, or hexadecimal character) that this data byte d0 is to be written to bank 0 (bank $60_0$). The address at which this data byte d0 is to be written, within bank 0, is indicated by the $0^{th}$ position of the concatenated address register pair L11:L10, which in this case is address 10, or 0x00100. Because the bank indicator in permutation register L7 matches the position of the input data byte in source registers L21:L20, no permutation is performed for this byte.

The next most significant input data byte d1 in source registers L21:L20 is permuted in this example, however. Permutation register L7 stores the value 8 for this input data byte (position 1), indicating that input data byte d1 is to be written to bank 8 (bank $60_8$). The address within bank 8 at which this input data byte d1 is to be written is indicated in the corresponding position in address registers L11:L10 for bank 8, which in this case is address 3, or 0x00030. This input data byte is thus written at a location that is permuted from its position in source registers L21:L20.

The other input data bytes d15:d2 in source registers L21:L20 are written to vector memory 50 in similar fashion. It is, of course, important from the standpoint of data coherency that the programmer using these permuted write instructions ensure that no more than one input data byte be written into any given bank $60_x$, especially considering that this write instruction is intended to be executed in a single instruction cycle. As such, the bank $60_x$ corresponding to an input data byte position in the source registers that is written to a different bank $60_y$ will itself generally receive input data from a different input data byte position in the source registers. In the example of FIG. 9, this is shown by the example of bank $60_1$, which stores input data byte d4 from position 4 in source registers D21:D20 in an address indicated by the address value 1 (0x00010) stored in the contents of the position of address registers L11:L10 corresponding to bank $60_1$.

It is contemplated that those skilled in the art having reference to this specification will be readily able to construct input permutation circuitry 66 to perform the permuted routing of input data from input register 52 to memory array 60, in the manner indicated by the permutation pattern stored in the specified register.

Figure 10:
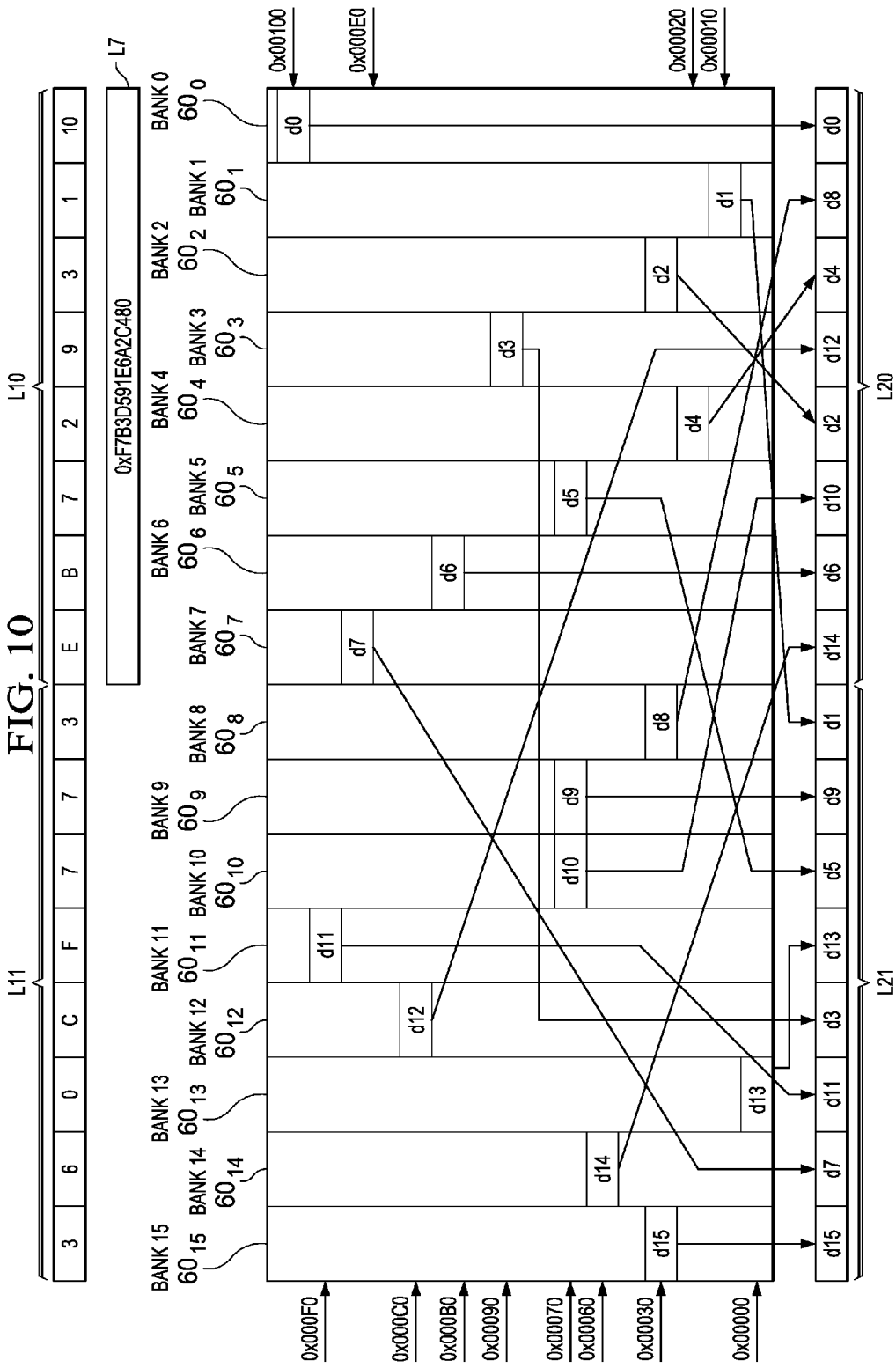
FIG. 10 is an electrical diagram, in block form, illustrating the operation of the vector memory of FIG. 6 in performing a permuted vector read operation.

FIG. 10 illustrates an example of the operation of output permutation circuitry 68 in executing a permuted read write instruction. An example of the instruction statement for the example of the vector write illustrated in FIG. 9 is:

LURPERML16B.<lm>$LMEM, L11:L10, L7, L21: 20,

This instruction statement indicates that a sixteen-byte permuted read is to be performed to the local memory 33, 35 indicated by the operand <lm>, with the address vector residing in concatenated registers L11 and L10 of register file 44, the output permutation pattern stored in register L7 of register file 44. Concatenated registers L21 and L20 of register file 44 will be the destination registers of the data read from the addressed locations of memory array 60. As before, these particular registers in register file 44 are general purpose registers, and as such each of these registers may serve as an address, source, destination, permutation, or other register function in the various instructions, as specified by the register identifiers in the instruction statement or opcode.

According to this embodiment of the invention, the permuted vector read instruction is performed by reading the contents of each bank $60_x$ at the address specified in the corresponding position of the address registers, and forwarding those contents to the byte position of the destination registers indicated by the contents of the permutation register, at the position corresponding to that bank. This operation is illustrated by the example of the permuted vector read instruction of FIG. 10. The contents of address location 3 (0x00030) of bank $60_{15}$ are read, because the most significant byte position (the $16^{th}$) of the specified address register pair L11:L10 contains the address value 3. The most significant nibble position of the permutation pattern stored in the specified permutation register (L7) is F. This indicates that the byte read from bank $60_{15}$ will be forwarded by output permutation circuitry 68 to the most significant byte position of output register 54, and thus to the most significant byte position of destination register pair L21:L20. For this byte, read from bank $60_{15}$, no permutation is in fact performed, as the permutation pattern indicates that the contents read from this bank $60_{15}$ remain in that corresponding byte position.

The next most significant byte in address registers L11: L10, corresponding to bank $60_{14}$, stores the contents 6. As such, memory address 0x00060 of bank $60_{14}$ is read. The next most significant nibble position in specified permutation register L7 is 7, indicating that the contents of bank $60_{14}$ are to be output in byte position 7 (eighth least significant byte position). Output permutation circuitry 68 thus forwards that output data byte to position 7 in output register 54, and thus eventually to the corresponding position of destination registers L21:L20 (i.e., in this case, to the most significant byte of register L20).

Output permutation circuitry 68 similarly routes the data read from each of the banks of memory array 60 to the byte position to the specified destination registers, via output register 54, according to the pattern contained in the specified permutation register. It is contemplated that output permutation circuitry 68, in combination with output circuitry 69, may be able to route the contents of one or more of banks $60_x$ to multiple byte positions in output register 54, for example by way of some sort of saturating pack operation. It is contemplated, however, that some restrictions on such multiple-output operation may be enforced, depending on the construction of output permutation circuitry 68.

Referring back to FIG. 3, each of local memories 33, 35 are contemplated to be constructed and operational in the manner described above in connection with the embodiments of the invention, such that a wide range of access instructions can be executed locally from the viewpoint of corresponding execution units 32, 34. In addition, because each local memory 33, 35 is dedicated to a single corresponding execution unit 32, 34, minimal memory access latency can be achieved. Especially with operations such as vector read and write accesses, streaming or stack access, and input and output permutation, these local memories 33, 35 according to this embodiment of the invention are contemplated to provide substantial performance improvement to digital signal processors and co-processors arranged according to this invention. In particular, it is contemplated that this invention will be especially useful in execution of complex digital signal processing routines that involve somewhat non-sequential memory access, such as the retrieval of "twiddle" factors from a relatively large set of values, as performed in modern Discrete Fourier Transform processing. It is also contemplated that the retrieval of values from multiple pseudo-random number tables, as performed in conventional Kasumi cipher applications, will be facilitated greatly according to this invention. Other functions and routines involved in LDPC decoding, matrix algebra, turbo decoding, and Kasumi processing, in which data are read and written by way of some permuted sequence of addresses, are contemplated to be greatly improved in efficiency according to this invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:
1. Programmable digital logic circuitry, comprising:
   a plurality of processor clusters, each processor cluster comprising:
      a plurality of sub-clusters, each sub-cluster comprising an execution unit for executing an instruction;
      at least one local memory associated with and coupled to a single sub-cluster; and
      switch circuitry, coupled to each of the plurality of sub-clusters in the processor cluster;
   a memory resource, coupled to the switch circuitry of each of the plurality of processor clusters; and
   a vector memory, coupled to at least one input register, at least one output registers and to a control circuitry; comprising:
      a plurality of addressable memory locations arranged into a plurality of banks;
      input permutation circuitry, for routing each of a plurality of data elements at positions within the input register corresponding to the plurality of banks, to a different one of the plurality of banks in the vector memory, according to a permutation pattern; and
      output permutation circuitry, for routing the contents of an addressed location in each of the plurality of banks to a position within the output register corresponding to a different one of the plurality of banks, according to a permutation pattern.

2. The circuitry of claim 1, wherein the memory resource comprises:
at least one global register bank.

3. The circuitry of claim 1, wherein the memory resource comprises:
an addressable global memory.

4. The circuitry of claim 1, wherein the control circuitry receives signals corresponding to instruction opcodes and instruction predicates;
wherein the vector memory comprises a plurality of addressable memory locations arranged into a plurality of banks;
wherein the sub-cluster associated with the local memory comprises a plurality of registers;
wherein the control circuitry is operable, responsive to the instruction opcodes and instruction predicates, to control the operation of the vector memory in a vector address mode to write data from an identified source register in the plurality of registers to a location in each of the plurality of banks indicated by an address value in an identified address register in the plurality of registers; and
wherein the control circuitry is operable, responsive to the instruction opcodes and instruction predicates, to control the operation of the vector memory in the vector address mode to read data from a location in each of the plurality of banks indicated by an address value in an identified address register in the plurality of registers and to store the read data in an identified destination register in the plurality of registers.

5. The circuitry of claim 4, wherein the identified address register comprises a plurality of entries, each entry corresponding to one of the plurality of banks and storing an address for that corresponding bank.

6. The circuitry of claim 4, wherein the vector memory further comprises:
input permutation circuitry, for routing each of a plurality of data elements at positions within the input register corresponding to the plurality of banks, to a different one of the plurality of banks in the vector memory, according to a permutation pattern; and
output permutation circuitry, for routing the contents of an addressed location in each of the plurality of banks to a position within the output register corresponding to a different one of the plurality of banks, according to a permutation pattern;
wherein the control circuitry is operable, responsive to the instruction opcodes and instruction predicates indicating a permuted read operation, to control the operation of the vector memory in the vector address mode, for each of the plurality of banks, to read data from a location in the bank corresponding to an address value in the identified address register, and to forward the read data to a position in the identified destination register indicated by a value in an identified permutation register of the plurality of registers corresponding to the bank; and
wherein the control circuitry is operable, responsive to the instruction opcodes and instruction predicates indicating a permuted write operation, to control the operation of the vector memory in the vector address mode to write data from a position in the identified source register to one of the plurality of banks indicated by a corresponding value in an identified permutation register of the plurality of registers, at a location in that indicated bank corresponding to an address value in the identified address register.

7. The circuitry of claim 1, wherein the control circuitry receives signals corresponding to instruction opcodes and instruction predicates;
wherein the vector memory comprises a plurality of addressable memory locations arranged into a plurality of banks;
wherein the sub-cluster associated with the local memory comprises a plurality of registers;
wherein the control circuitry is operable, responsive to the instruction opcodes and instruction predicates, to control the operation of the vector memory in a streaming mode to write data from an identified source register to a location in the vector memory indicated by an address value in an identified address register in the plurality of registers and to then adjust the address value in the identified address register;
wherein the control circuitry is operable, responsive to the instruction opcodes and instruction predicates, to control the operation of the vector memory in a streaming mode to read data from a location in the vector memory indicated by an address value in an identified address register in the plurality of registers, to then adjust the address value in the identified address register, and to forward the read data to an identified destination register.

8. The circuitry of claim 7, wherein the identified address register stores an index value;
wherein an identified base register in the plurality of registers stores a base address value; and
wherein the location in the vector memory indicated by an address value corresponds to a sum of the contents of the identified address register with the contents of the identified base register.

9. The circuitry of claim 7, wherein an identified register in the plurality of registers stores a buffer size value; and
wherein the control circuitry control circuitry is operable to wrap around the adjusted address value within a region of the vector memory address space corresponding to the buffer size value.

10. A processor system, comprising:
a main processor, comprising programmable logic for executing program instructions, coupled to a local bus;
a memory resource coupled to the local bus, the memory resource comprising addressable memory locations for storing program instructions and program data;
a co-processor, coupled to the local bus, for executing program instructions called by the main processor, the co-processor comprising:
a plurality of processor clusters, each processor cluster comprising:
a plurality of sub-clusters, each sub-cluster comprising an execution unit for executing an instruction;
at least one local memory associated with and coupled to a single sub-cluster; and
switch circuitry, coupled to each of the plurality of sub-clusters in the processor cluster;
a memory resource, coupled to the switch circuitry of each of the plurality of processor clusters; and
a vector memory, coupled to at least one input register, at least one output registers and to a control circuitry, comprising:
a plurality of addressable memory locations arranged into a plurality of banks;
input permutation circuitry, for routing each of a plurality of data elements at positions within the input register corresponding to the plurality of banks, to a different one of the plurality of banks in the vector memory, according to a permutation pattern; and
output permutation circuitry, for routing the contents of an addressed location in each of the plurality of banks to a position within the output register corresponding to a different one of the plurality of banks, according to a permutation pattern.

11. The system of claim 10, wherein the control circuitry receives signals corresponding to instruction opcodes and instruction predicates;
wherein the vector memory comprises a plurality of addressable memory locations arranged into a plurality of banks;
wherein the sub-cluster associated with the local memory comprises a plurality of registers;
wherein the control circuitry is operable, responsive to the instruction opcodes and instruction predicates, to control the operation of the vector memory in a vector address mode to write data from an identified source register in the plurality of registers to a location in each of the plurality of banks indicated by an address value in an identified address register in the plurality of registers;
wherein the control circuitry is operable, responsive to the instruction opcodes and instruction predicates, to control the operation of the vector memory in the vector address mode to read data from a location in each of the plurality of banks indicated by an address value in an identified address register in the plurality of registers and to store the read data in an identified destination register in the plurality of registers; and
wherein the identified address register comprises a plurality of entries, each entry corresponding to one of the plurality of banks and storing an address for that corresponding bank.

12. The system of claim 11, wherein the vector memory further comprises:
input permutation circuitry, for routing each of a plurality of data elements at positions within the input register corresponding to the plurality of banks, to a different one of the plurality of banks in the vector memory, according to a permutation pattern; and
output permutation circuitry, for routing the contents of an addressed location in each of the plurality of banks to a position within the output register corresponding to a different one of the plurality of banks, according to a permutation pattern;
wherein the control circuitry is operable, responsive to the instruction opcodes and instruction predicates indicating a permuted read operation, to control the operation of the vector memory in the vector address mode, for each of the plurality of banks, to read data from a location in the bank corresponding to an address value in the identified address register, and to forward the read data to a position in the identified destination register indicated by a value in an identified permutation register of the plurality of registers corresponding to the bank; and
wherein the control circuitry is operable, responsive to the instruction opcodes and instruction predicates indicating a permuted write operation, to control the operation of the vector memory in the vector address mode to write data from a position in the identified source register to one of the plurality of banks indicated by a corresponding value in an identified permutation register of the plurality of registers, at a location in that indicated bank corresponding to an address value in the identified address register.

13. The system of claim 10, wherein the control circuitry receives signals corresponding to instruction opcodes and instruction predicates;
wherein the vector memory comprises a plurality of addressable memory locations arranged into a plurality of banks;
wherein the sub-cluster associated with the local memory comprises a plurality of registers;
wherein the control circuitry is operable, responsive to the instruction opcodes and instruction predicates, to control the operation of the vector memory in a streaming mode to write data from an identified source register to a location in the vector memory indicated by an address value in an identified address register in the plurality of registers and to then adjust the address value in the identified address register;
wherein the control circuitry is operable, responsive to the instruction opcodes and instruction predicates, to control the operation of the vector memory in a streaming mode to read data from a location in the vector memory indicated by an address value in an identified address register in the plurality of registers, to then adjust the address value in the identified address register, and to forward the read data to an identified destination register.

14. The system of claim 13,
wherein the identified address register stores an index value;
wherein an identified base register in the plurality of registers stores a base address value; and
wherein the location in the vector memory indicated by an address value corresponds to a sum of the contents of the identified address register with the contents of the identified base register.

15. The system of claim 13, wherein an identified register in the plurality of registers stores a buffer size value; and
wherein the control circuitry control circuitry is operable to wrap around the adjusted address value within a region of the vector memory address space corresponding to the buffer size value.

* * * * *